Jan. 17, 1939.  C. C. UTZ ET AL  2,144,170
JOINT BETWEEN BODY AND FRAME
Filed June 5, 1937
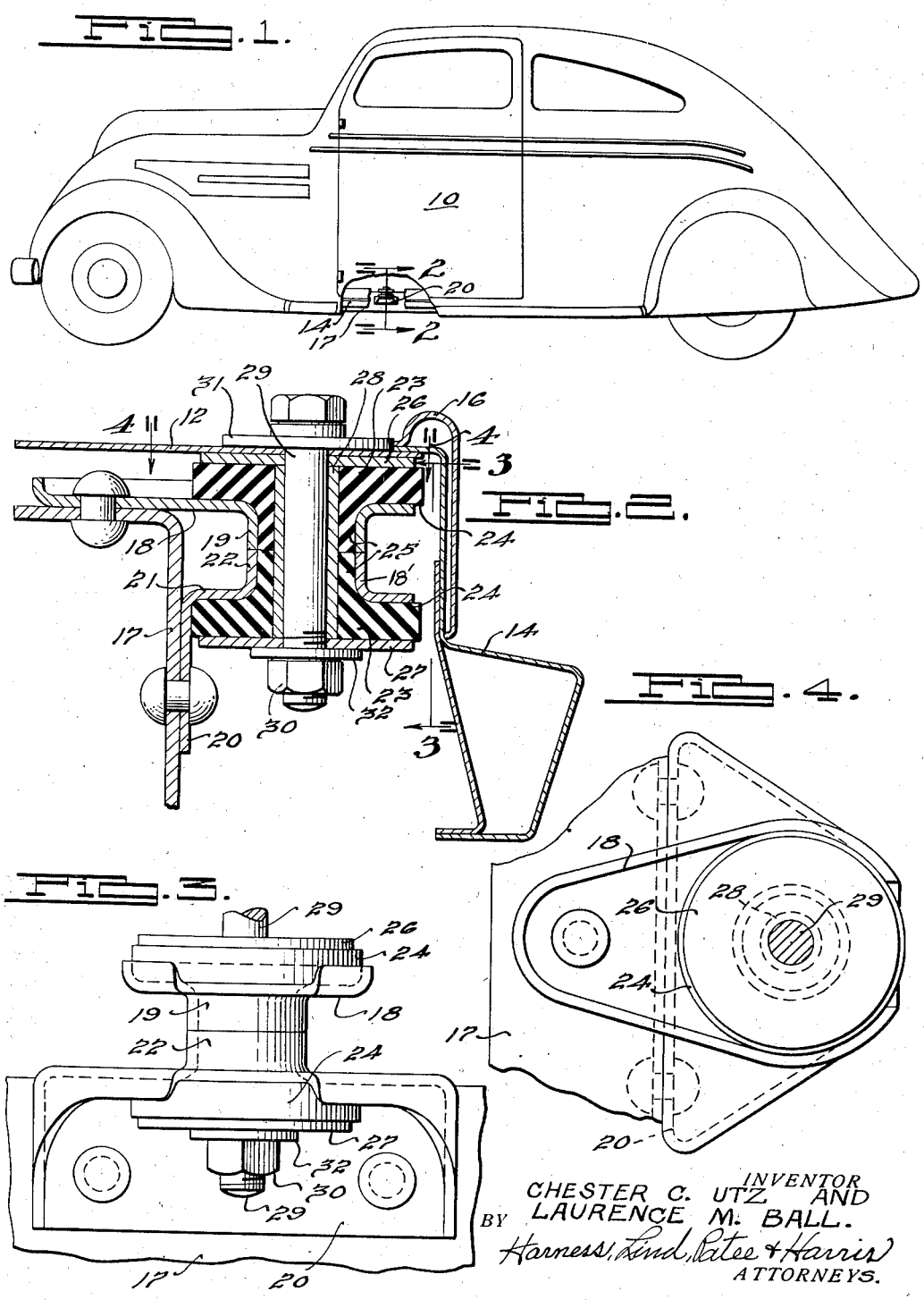
INVENTOR
CHESTER C. UTZ AND
LAURENCE M. BALL.
BY Harness, Lind, Patee & Harris
ATTORNEYS.

Patented Jan. 17, 1939

2,144,170

UNITED STATES PATENT OFFICE 2,144,170

JOINT BETWEEN BODY AND FRAME

Chester C. Utz and Laurence M. Ball, Detroit, Mich., assignors to Chrysler Corporation, Highland Park, Mich., a corporation of Delaware Application June 5, 1937, Serial No. 146,548

1 Claim. (Cl. 296—35)

This invention relates to a joint for securing together parts having a limited relative movement therebetween and more particularly to a joint for securing an automobile body to the chassis therefor.

An object of the invention is to provide a joint which is inexpensive to manufacture and which may be readily assembled between the body and chassis.

Another object of the invention is to provide a joint having a non-metallic connection cooperating with metallic parts which are interlocked but separated by a portion of the non-metallic connection.

A further object of the invention is to provide a joint of the resilient compression type which may be secured to the parts to be joined with the resilient material under a predetermined compression.

Other objects and advantages of the invention will be more apparent from the following description taken in connection with the accompanying drawing, in which:

Fig. 1 is a side elevation of an automobile with a portion thereof broken away to show the location of one of the joint members between the automobile body and the chassis therefor.

Fig. 2 is an enlarged sectional view of the joint taken on line 2—2 of Fig. 1 and showing its connection to the supporting and supported parts.

Fig. 3 is a side elevation of the joint as viewed in the direction indicated by the arrows 3—3 of Fig. 2, a portion of the securing means being broken away with the supported part removed.

Fig. 4 is a plan view of the joint as viewed in the direction of the arrows 4—4 of Fig. 2, the securing means being in section.

Referring to the drawing, the invention is illustrated and described in connection with a vehicle including a body 10 having a floor 12, a side sill 14 and a scuff plate 16. The body is mounted on a chassis, including a longitudinally extending frame member 17, by a resilient connection which insulates the body from the chassis, particularly against noise and vibration commonly developed in the chassis. While but one of the connections is illustrated and described it will be understood that the number and location of such connections can be varied to meet the particular requirements.

In vehicle constructions the body thereof extends outwardly beyond the chassis side rail members and this arrangement is illustrated herein. The frame member 17 is channel-shaped and has riveted or otherwise suitably secured to the upper flange thereof a plate-like member 18 projecting outwardly therefrom and extending beneath and spaced from a portion of the floor 12. A tubular portion 19 is struck from the plate 18 and extends downwardly therefrom in spaced relation to the web of the frame member 17. An angle bracket 18' is positioned beneath the plate 18 for cooperation therewith and includes a flange 20 riveted or otherwise secured to the web of the member 17 and also includes an outwardly extending flange 21 disposed beneath the outwardly extending plate 18. A tubular portion 22 is struck from the flange 21 and extends upwardly to the correspondingly tubular portion 19 of the member 18, the abutting ends of these tubular portions being preferably welded together. It will be understood, of course, that the plate 18 and cooperating lower bracket 18' may be made in one piece but the arrangement illustrated is believed to be more desirable from a manufacturing standpoint.

A pair of resilient members 23, 23, preferably comprising rubber, insulate the body 10 from the support and chassis. These members include a relatively thick flange portion 24 and a somewhat thinner integral tubular portion 25, the latter portions extending into the tubular portions provided by the plate 18 and cooperating lower bracket 18'. If desired, the tubular portions 25 may be formed integral and integral with one of the flange portions 24. In this case the other flange portion would be a mere disc. The flange 24 of the upper member 23, as illustrated in Fig. 2, is disposed between the floor 12 and plate 18 and rests upon the upper face of the latter, while the flange 24 of the lower member 23 engages the outer face of the flange 21 of the lower bracket 18'. A washer 26 is disposed between the upper face of the flange 24 of the upper member 23 and the floor 12 while a similar washer 27 engages the outer face of the flange 24 of the lower member 23. The washers 26 and 27 preferably terminate short of the outer edge of the flange 24, as illustrated. A metallic sleeve 28 extends through the tubular portions 25 of the members 23 and is spaced from the tubular portions of the plate 18 and the lower bracket 18' by the latter. The opposite ends of the sleeve 28 abut the inner faces of the washers 26 and 27 respectively and limit the compressive force applied to the members 23. A bolt 29 extends through an aperture in the floor 12 and the sleeve 28 for securing the body to the chassis by means of the joint or connection described above. A nut member 30 is threaded on the lower end of the bolt 29 and securely retains the aforesaid parts in assembled position. A washer 31 is disposed between the head of the bolt and the floor 12 and another washer 32 is disposed between the nut member 30 and the washer 27. It will be understood that as the nut member 30 is threaded on the bolt 29 the rubber members 23 are placed under compression, the degree thereof being limited by the sleeve 28 acting as a spacer for the washers 26 and 27.

In assembly, the plate 18 and cooperating lower bracket are preferably secured to the chassis during assembly of the frame structure and the members 23, 23 together with the sleeve 28 installed immediately before assembly of the body to the chassis. When these parts are thus assembled the body is placed upon the chassis and a drift pin inserted in the opening through the body floor 12 for properly aligning this opening with the sleeve 28.

The degree of hardness of the rubber members 23, 23 may be varied to provide the required limited relative movement between the body and chassis and also to insulate the one from the other, and while these rubber members are placed under a predetermined compression, they are nevertheless free to accommodate the aforesaid relative movement and to also absorb vibratory forces set up in the vehicle chassis.

Various changes including the size, shape and arrangement of parts may be made without departing from the spirit of the invention and it is not our intention to limit the invention other than by the terms of the appended claim.

We claim:

In a joint for securing automobile bodies to automobile chassis, the combination of a body floor, a chassis frame, a plate secured to the upper surface of said frame and projecting outwardly therefrom beneath said floor, a tubular portion struck downwardly from the outwardly projecting portion of said plate, an angle bracket having one flange thereof secured to the side of said frame and another flange extending outwardly beneath the outwardly extending flange of said plate, a tubular portion struck upwardly from the outwardly extending flange of said angle bracket, the adjacent ends of said tubular portions being welded together, securing means projecting from said floor through said tubular portions, and rubber between said securing means and said tubular portions.

CHESTER C. UTZ.
LAURENCE M. BALL.